United States Patent [19]

Ullmann et al.

[11] Patent Number: 4,557,075
[45] Date of Patent: Dec. 10, 1985

[54] APPARATUS FOR SHAPING AN ELECTRODE OF A PRESCRIBE SPATIAL CONFIGURATION BY MEANS OF AN ABRADING DIE

[75] Inventors: Werner Ullmann, Muralto; Max Bantle, Platz Walzenhausen, both of Switzerland; Harry Neumann, Ennepetal; Ulrich H. Seuser, Neuwied, both of Fed. Rep. of Germany; Andre Mathys, Ennetbürgen, Switzerland

[73] Assignee: Werner Ullmann, Orselina, Switzerland

[21] Appl. No.: 562,108

[22] Filed: Dec. 16, 1983

[30] Foreign Application Priority Data

Dec. 21, 1982 [CH] Switzerland ............... 7432/82
Oct. 14, 1983 [CH] Switzerland ............... 5608/83

[51] Int. Cl.⁴ ............................................. B24B 19/00
[52] U.S. Cl. ......................................... 51/58; 51/165.71; 51/157
[58] Field of Search ......... 51/157, 58, 165 R, 165.71, 51/216 ND, 67, 165 TP; 74/826

[56] References Cited

U.S. PATENT DOCUMENTS

| | | | |
|---|---|---|---|
| 2,921,487 | 1/1960 | Schabot | 74/826 |
| 3,443,341 | 5/1969 | Honda | 51/165 R |
| 3,698,138 | 10/1972 | Wada | 51/165 TP |
| 3,988,863 | 11/1976 | O'Connor | 51/157 |
| 4,156,327 | 5/1979 | O'Connor | 51/157 |
| 4,186,527 | 2/1980 | Hausermann | 51/157 |
| 4,186,529 | 2/1980 | Huffman | 51/165 TP |
| 4,277,915 | 7/1981 | Hausermann | 51/58 |

*Primary Examiner*—Harold D. Whitehead
*Attorney, Agent, or Firm*—Werner W. Kleeman

[57] ABSTRACT

An apparatus for shaping a three-dimensional workpiece by inducing the following relative motions between an abrading die member and the workpiece: a feed motion, periodical retract and advance motions in a z-direction, and a planetary or orbital motion in the x and y directions. The mechanism which generates the planetary or orbital motion is provided with means for infinitely adjusting the eccentricity of this motion and is provided with means for selectively and releasably fixing the chosen amount of eccentricity. An assembly is provided to adapt the following process values to conditions within a gap between the die and the workpiece such that the abrading process is optimized: (i) feed pressure between the die and the workpiece during an abrading period of a work cycle; (ii) speed of the feed motion; and (iii) speeds of periodical retract and advance motions.

41 Claims, 10 Drawing Figures

4,557,075

APPARATUS FOR SHAPING AN ELECTRODE OF A PRESCRIBE SPATIAL CONFIGURATION BY MEANS OF AN ABRADING DIE

BACKGROUND OF THE INVENTION

The present invention broadly relates to an apparatus for shaping workpieces and, more specifically, pertains to a new and improved construction of an apparatus for shaping electrode workpieces by means of an abrading medium introduced into a gap between the latter and an abrading die member and inducing relative motion between the two.

Generally speaking, the present invention relates to an improved apparatus for shaping an electrode workpiece to a prescribed spatial configuration by means of an abrading die having the same spatial configuration but (slightly) different dimensions. The difference in dimensions leaves an abrading gap between the die and the workpiece into which an abrading medium is introduced. The apparatus induces relative motion of a first type between the die and the workpiece to generate or refine a desired spatial configuration of the electrode workpiece. Relative motion of this first type is a composite motion composed of a feed motion and a planetary or orbital motion. A motion of a second type is provided which induces retracting and advancing motions between the die and the workpiece in order to improve flushing conditions in the abrading gap.

Representative constructions of electrode shaping apparatuses are exemplified by U.S. Pat. No. 4,186,527, granted Feb. 5, 1980, U.S. Pat. No. 4,227,915, granted July 14, 1981 and U.S. Reissue Pat. No. 27,588, granted Feb. 27, 1973.

Die making encompasses the manufacture of dies, molds and forms for the pressure casting, injection molding, punching, hot forming, cold forming and forging of plastics, rubbers and metals, especially steel, as well as their respective mixtures and alloys. These dies are often complicated and of (pronounced) three-dimensional design. There is particular demand in the aircraft and automotive industries for such difficult to make forms, often in conjunction with the maintenance of very close tolerances. Workpiece or machine components (for instance in engine manufacture) of hard to machine materials (for instance high temperature resistant alloys) are also produced by processes employed in die making. Such dies or components are often produced by spark erosion or electro-chemical apparatus. The electrodes employed in this apparatus have the same complex surfaces as do the dies or components they produce. Recent technology employs special apparatus to manufacture such electrodes. The electrode is shaped from a blank of material by an abrading or grinding or filing process. The material may be for instance graphite. The tool, for instance abrading die required for this operation has the (negative) spatial configuration of the electrode with a small negative deviation from the nominal spatial configuration. The abrading or filing process is effected by providing a relative motion between the die and the material blank of the workpiece. An abrading medium is impregnated into the surface of the die to promote the abrading or filing action. In addition, a fluid is introduced into the abrading gap between the die and the workpiece.

The relative motion is composed of two types of motion components. One type is the feed motion of the abrading or filing die towards or away from the workpiece (vertical). This feed motion can also be circular (in a vertical plane). The other type is a revolving or circular motion of the electrode workpiece in a horizontal plane. The revolving motion is also called orbital or planetary. It can also be spherical. The radius or the eccentricity of the revolving motion can be adjustable.

The abrading process is continued until the electrode workpiece has assumed the spatial configuration of the abrading die. The process is then terminated. This is effected by setting a depth stop on the apparatus to the desired dimension. The spatial configuration of the electrode workpiece can be increased or reduced in size in relation to the spatial configuration of the die. This is effected by adjusting the eccentricity of the revolving motion. This known method of shaping the spatial configuration of an electrode workpiece has the following disadvantages:

(a) The eccentricity of the relative motion cannot be changed during the abrading process. The apparatus must be shut down to perform this operation.

(b) The pressure between the die and the electrode workpiece must be adapted to changing work conditions during the abrading process. The conditions of the abrading process vary in accordance with the size of the surface engaged in abrading between the die and the electrode workpiece. The size or angular orientation of the surface engaged in the abrading process can change within short periods of time. A corresponding adaptation of the abrading pressure to the abrading conditions and to the strength of the die and of the workpiece is not possible with known means of manufacture. Therefore, there is a risk that the abrading pressure is too high or too low at certain times. This results in either faultily finished surface regions or in damage to the die or to the electrode workpiece or in an excessive long abrading time. In any event, the manufacturing costs are unnecessarily increased.

(c) For improved flushing of the abrading gap, the die is periodically retracted from the workpiece and after a short interval advanced to the workpiece again. The flushing fluid transports abraded material out of the gap. The speed of the brief retraction and of the advance is greater than the speed of feeding during abrading or filing. As the die progresses more deeply into the material blank of the workpiece, the amount of surface area engaged in the abrading or filing process increases. The spatial configuration of the surface also becomes more complex. In both cases, the speed of retraction and advance is no longer adapted to the conditions in the abrading gap. This can lead to damage to the surfaces of the die and of the workpiece.

(d) The retraction and advance of the die is often effected with a greater force than necessary, since the force cannot be correlated to the mass or weight of the die, which varies from die to die. Each change in direction of motion and each acceleration or deceleration of the motion imparts impulse forces to the die, which have an undesirable effect on the accuracy of its adjustment in relation to the workpiece. This results in a poor quality of the spatial configuration of the workpiece.

SUMMARY OF THE INVENTION

Therefore, with the foregoing in mind it is a primary object of the present invention to provide a new and improved construction of an apparatus which does not have associated with it the aforementioned drawbacks and shortcomings of the prior art constructions.

Another and more specific object of the present invention aims at providing a new and improved construction of an apparatus for shaping an electrode to a predetermined spatial configuration by means of an abrading or filing die of the previously mentioned type by providing a special mechanism for adjusting the eccentricity of the planetary or orbital motion during the shaping process and by providing an assembly which controls the rate of feed, the speed of retracting and advancing motion and the pressure between the die and the workpiece.

Another object of the invention is to devise an apparatus of the type described, wherein the spatial configuration of the finish-shaped electrode workpiece is entirely complementary to the spatial configuration of the die.

Still a further object of the invention is to provide a workpiece shaping apparatus, wherever a plurality of workpieces having complex spatial configurations can be shaped with a single die.

A control assembly implements the following functions at every moment of the abrading process:

(a) Adaptation of the pressure between the die and the workpiece to the conditions in the abrading gap. Damage to the die and to the workpiece as well as faulty finishing of surfaces on the workpiece is thereby avoided. Furthermore, the abrading time is reduced. The manufacturing costs for the workpiece are lowered.

(b) Adaptation of the speed of the periodical retract and advance motion to the conditions in the abrading gap and also to the quantity of flushing fluid introduced into the gap. Flushing conditions in the abrading gap are thereby improved. Abraded material is completely removed from the gap even with very complex surfaces.

(c) The transition from the normal rate of feed to the substantially greater speed of periodical retraction and advance as well as the reverse transitions are performed smoothly. In other words the acceleration and deceleration processes are dynamically controlled. The so-called reversal impulses or shocks and their associated noises are thereby avoided. The machine is spared, which increases the length of its useful life with undiminished accuracy.

Now in order to implement these and still further objects of the invention, which will become more readily apparent as the description proceeds, the apparatus of the present invention is manifested by the features that there is provided a motor-operated device or means for the infinite or continuous change of the eccentricity of the planetary or orbital movement, and a selectable releasable locking means for arresting the set value of the eccentricity. Additionally, there is provided a control assembly for (i) adaptation of the pressure between the die and the electrode workpiece during the feed motion; (ii) adaptation of the velocities of the feed motion; and (iii) adaptation of the velocity of the periodical retract and advance motion of the second type to the conditions prevailing in the abrading gap.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE PREFERRED EMBODIMENTS

Figure 1:
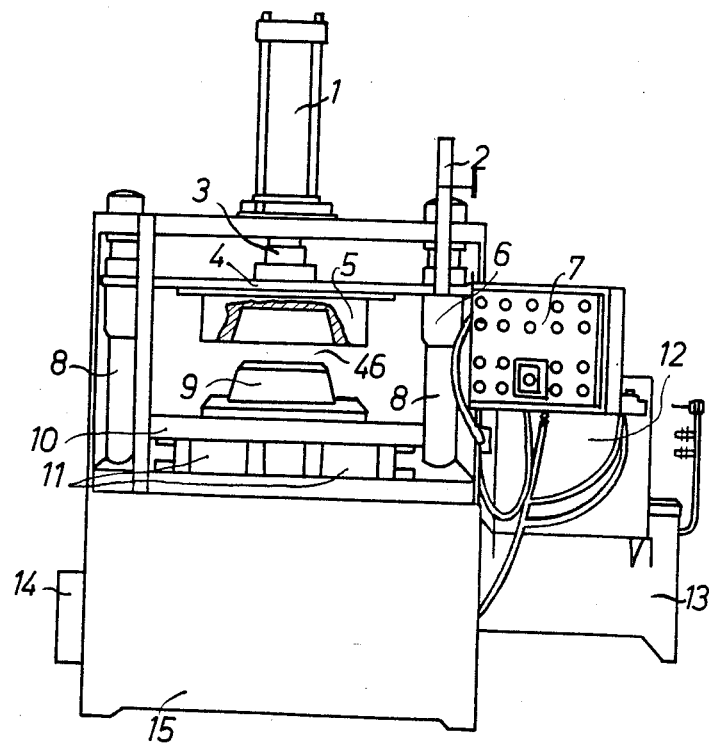
FIG. 1 schematically illustrates an apparatus constructed according to the present invention.

Describing now the drawings, it is to be understood that to simplify the showing of the drawings only enough of the structure of the apparatus has been illustrated therein as is needed to enable one skilled in the art to readily understand the underlying principles and concepts of this invention. The illustrated exemplary embodiment of the apparatus will be seen to comprise a hydraulic cylinder 1 having a movable piston or ram 3. A platen or ram plate 4 is mounted on the ram 3 and vertically guided by a number of guide posts 6, for instance four. Only two of these guide posts 6 are visible in the drawing of FIG. 1. Platen 4 is fitted with an appropriate adapter upon which a measuring device 2 is mounted. This measuring device 2 can, for instance, be a depth stop switch which terminates the work process as soon as a preset depth has been attained. A three-dimensional tool, typically an abrading die member 5 is fastened to the underside of the platen or ram plate 4. The abrading die member 5 is provided with the spatial configuration which is to be imparted to a workpiece 9. The workpiece or electrode workpiece 9 is, in the present illustrative example, formed of graphite and is mounted in the form of a blank upon a lower work table or platen 10. Electrode workpiece 9 can equally well be formed of another material, for instance various metals and their alloys, or of an insulating material, for instance wood. Insulating materials must be provided with an electrical conducting layer. The electrical conductivity of the workpiece material is important when the finished electrode 9 is to be used for electrode erosive or electrochemical machining.

Figure 10:
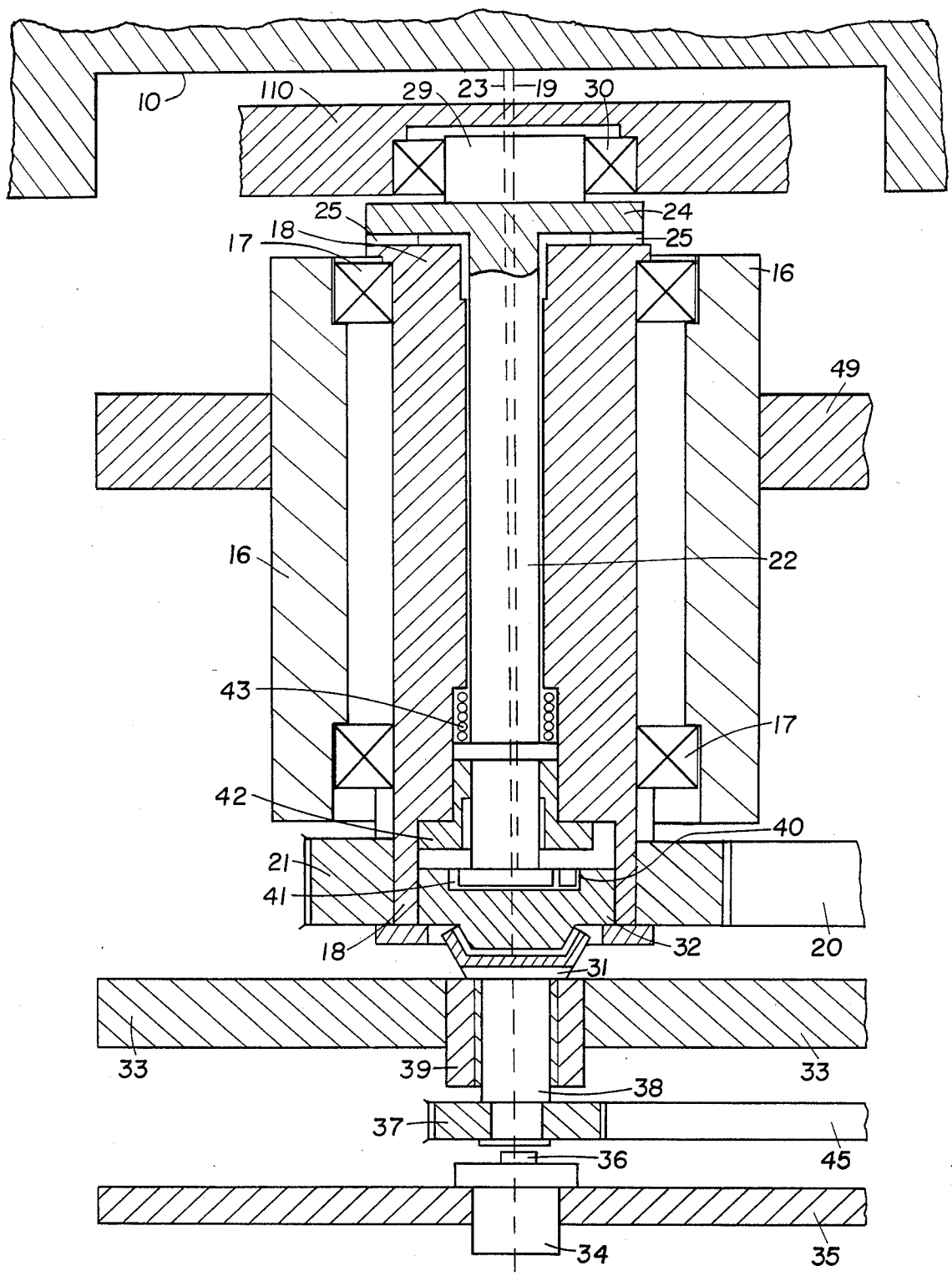
FIG. 10 schematically illustrates a counterweight mechanism for dynamically counterbalancing the mechanism of FIG. 2.

The work table or platen 10 engages two eccentric drives 11 which impart an orbital or planetary, i.e. revolving motion to the work table or platen 10 and with it to the workpiece 9. The motion occurs in the x and y coordinate axes. The eccentric drive will be described in detail later in conjunction with FIGS. 2, 3 and 10. Operating console 7 is provided with a considerable number of controls. The operator can turn the electronic NC-control unit 12, the hydraulic system 13, the flushing and filtering unit 14 and the drive motors located in base 15 on and off with these controls. However, the operator seldom has to take influencing measures in the work process. Normally, the work proceeds automatically, as will be described in more detail later.

The work process begins in that the electronic NC-control unit 12 lowers the platen or ram plate 4 carrying the die member 5 in the direction of the workpiece 9 by activating the hydraulic system 13. Simultaneously both eccentric drives 11 are activated by the NC-control unit 12. They impart a revolving or orbital motion to the work table or platen 10 and the workpiece 9. The degree of eccentricity is determined by the NC-control unit 12. This will be described in more detail later. By this motion, the abrading die member 5 imparts the desired spatial configuration to the workpiece 9. During the abrading process, the die member 5 progresses at a predetermined rate of feed deeper and deeper into the workpiece 9. An abrading medium provides the correct abrading action. The abrading medium may be impregnated into the surface of the die member 5 or may be introduced into the abrading gap 46 between the workpiece 9 and the die member 5.

The abrading medium can also be introduced into the abrading gap 46 with the flushing fluid. During the entire abrading process, the flushing fluid is processed in the filter and flushing unit 14 and conducted to work table or platen 10 by hose lines or the like. Workpiece 9, which, before the abrading process, is provided with at least one, but preferably with a plurality of flushing channels, is mounted on the work table or platen 10 in such manner that the flushing fluid delivered by the filter and flushing unit 14 is conducted into the abrading gap 46. Alternatively, the die member 5 may be provided with flushing channels or both the die member 5 and the workpiece 9 may be provided with flushing channels.

The spatial configuration of the die member 5 represented in FIG. 1 is extremely simple. This is only for the purpose of an illustrative example. In reality, the surfaces, that is the spatial configuration of such die member 5, are considerably more complex.

During the abrading process the necessity arises of removing the material that has been abraded off, since it would hinder the further abrading process. In order to remove this material, the platen or ram plate 4 carrying the die member 5 is retracted from the workpiece 9 for certain predetermined intervals. The flushing fluid is then able to remove the abraded material. After a short pause, the platen 4 carrying the die member 5 advances in the direction of the workpiece 9 and resumes the abrading process at the normal rate of feed. Since the retract and advance motion takes place at a much greater speed than the normal feed motion, special measures are taken to assure that the accelerations and decelerations do not take place abruptly but are dynamically controlled. This will be described in more detail later in conjunction with FIG. 5.

Furthermore, a speed of the retract and advance motion of the die member 5 must be selected that will preferably ensure full removal of abraded material. Neither can any damage to the workpiece 9, which in this illustrative example consists of graphite, be tolerated. In the following this problem will be described in relation to two examples.

First assume that the die member 5 has not yet progressed deeply into the workpiece. The retract motion has the effect that the flushing fluid becomes turbulent and removes the abraded material. Die member 5 is then advanced toward the workpiece 9 at a high rate of speed. When the surfaces of the die member 5 and the workpiece 9 enter into close proximity, the pressure in the flushing fluid, which must remove any still remaining abraded material, increases suddenly.

For the second example, assume that the die member 5 has already progressed deeply into the workpiece 9. Now a speed for the periodical retract motion must be selected which does not lead to damage to the complex surfaces and nevertheless permits removal of abraded material. In practice, this cannot be accomplished with the retract motion alone. Therefore the subsequent advance motion of the die member 5 in the direction of the workpiece 9 is exploited to fully remove any remaining portion of the abraded material. This can for instance be implemented by advancing at a higher rate of speed. The pressure in the flushing medium then increases very rapidly. Contrarily, the advance motion can also be performed at low speed. The selection of the speed of the advance motion of the die member 5 depends on the complexity and fragility of the three-dimensional surfaces. This selection is effected by the NC-control unit 12.

At any time during the entire abrading process, the necessity may arise of modifying the eccentricity of the planetary motion of the workpiece 9 on the x and y coordinate axes. This is effected by the illustrative exemplary embodiments depicted in FIGS. 2 and 3.

Referring again to FIG. 1, when the die member 5 has progressed sufficiently deep into the graphite workpiece 9, the measuring device or depth stop 2, which engages a contact, terminates the abrading process.

A further aspect of the invention is to adapt the force with which the die member 5 is forced against the workpiece 9 to the conditions in the abrading gap 46. The conditions in the abrading gap 46 change as the abrading process progresses. This ensues from the fact that the size of the surfaces engaged in abrading contact varies. In order that the entire abrading process may be completed within a reasonable length of time, the abrading pressure must be continually adjusted. This is implemented in two ways. NC-control unit 12 is programmed in relation to the depth dimension (Z-axis) or in relation to time or speed. A sensor or feeler is installed in the proximity of the work table or platen 10 which senses the rate of flow of the flushing fluid between the flushing and filter unit 14 and the work table or platen 10. This sensor influences the NC-control unit 12 in correspondence with changes in the flow rate. The sensor must not always be provided.

In the following, assume that only the program relying on the depth dimension or the work time implements the adjustment of the abrading pressure between the die member 5 and the workpiece 9. The spatial configuration of the die member 5 is known. Therefore the approximate size of the surfaces engaged in the abrading process is known in relation to the depth (Z-axis) or to the processing time for a given processing speed. The abrading force can be varied corresponding to the variations in size calculated in advance of the surfaces engaged in the abrading process. When the sensor is also used or is used alone, it can communicate to the NC-control unit 12 that the predetermined depth has not been attained within the desired time, or that the desired depth has not been attained in the predetermined time. In this case, the NC-control unit 12 can increase the abrading force and thereby accelerate the abrading process. In doing so, consideration must be taken of the complexity and fragility of the surfaces. It is therefore advisable to set an upper value or threshold for the abrading force. This can for example be programmed into the NC-control unit 12 for each size of surface engaged in the abrading process.

Figure 2:
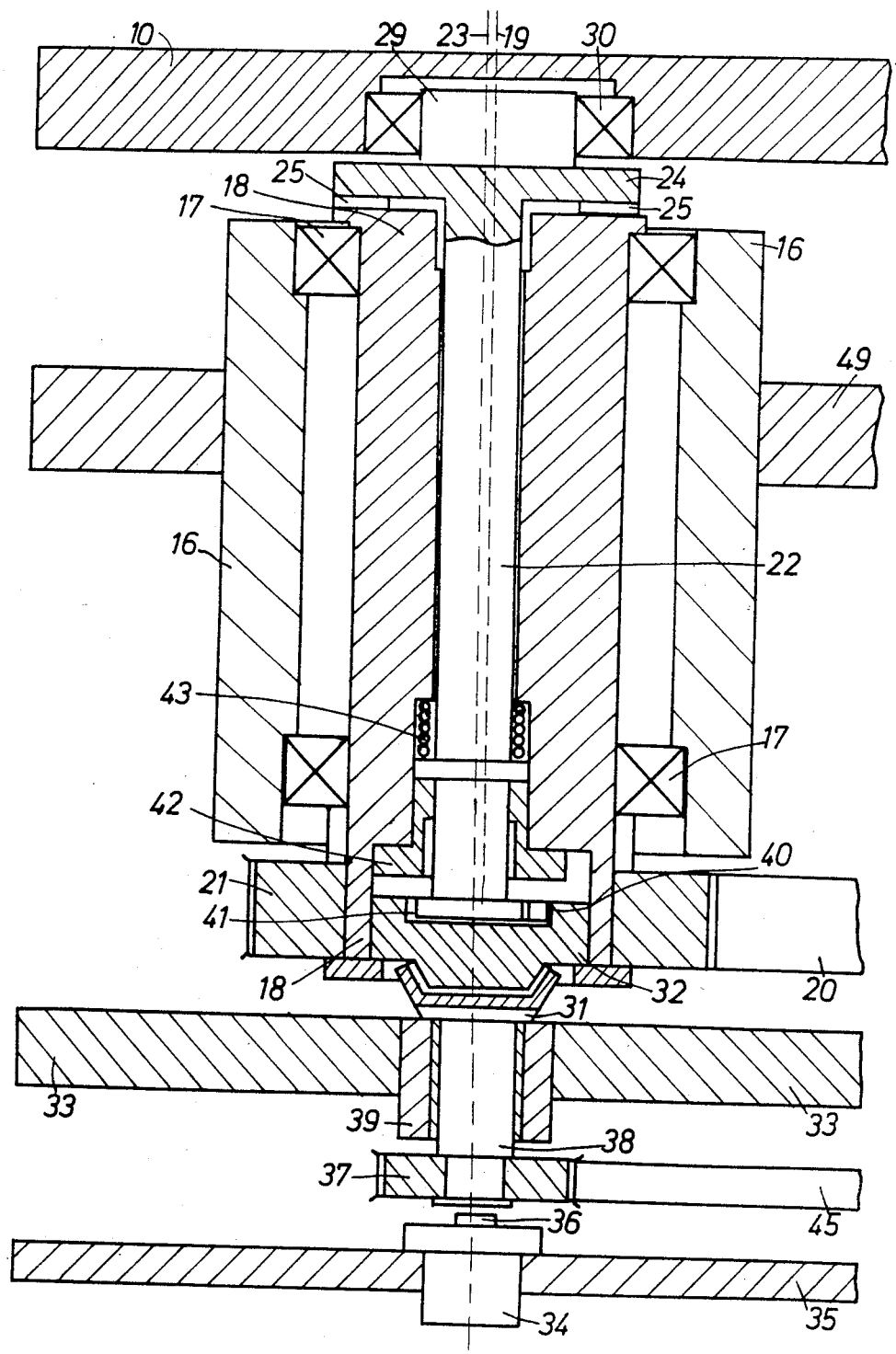
FIG. 2 schematically illustrates a mechanism for inducing planetary or orbital motion.

FIG. 2 illustrates in section one of the two eccentric drives 11. The drive illustrated is the left drive of FIG. 1. Since both drives are identical only this left drive will be described in the following. The drive comprises a housing 16 and a spindle or sleeve 18 rotating about an axis 19 in bearings 17. Housing 16 of the eccentric drive is mounted in a support 49. The right-hand eccentric drive is also mounted on the same support. Each eccentric drive has the same length which may be for instance about 30 cm. Spindle 18 is rotated by any suitable electric motor situated in the base 15 and not visible in the drawing. This is effected by a drive belt 20 and a drive wheel or pulley 21. Drive belt 20 is preferably either a toothed rubber belt or a chain. Drive wheel 20 is provided with corresponding recesses or teeth. The speed of the drive motor can be varied according to the desired conditions. It is adjusted either by the operator at the operating console 7 or by the NC-control unit 12.

A shaft 22 is rotatably mounted in the spindle 18. FIG. 2 illustrates the disposition of the shaft 22 out of the axis of rotation 19 of the spindle 18. The axis of rotation 23 of the shaft 22 is displaced several millimeters to the left of the rotational axis 19 of the spindle or sleeve 18. Shaft 22 is provided with a flange 24 at its upper end. Flange 24 engages the spindle 18 by means of a serrated or serration coupling 25. The serrated coupling is shown in detail in FIG. 3. It comprises an upper serrated or toothed ring 26 which is mounted on the flange 24 and a lower serrated or toothed ring 27 which is fixed to the spindle 18. Both serrated rings 26 and 27 mesh with one another and can also be separated from one another.

Flange 24 is provided with a crank assembly or crank drive 29 on the side facing the work table or platen 10. As shown in FIG. 2, the crank assembly or crank drive 29 is not centered on the axis 23 of the shaft 22. Crank assembly or crank drive 29 is drawn corresponding to a relative position of rotation of the shaft 22 in relation to the spindle 18 which produces an effective eccentricity of zero. This will be described in more detail in the following.

When the main drive motor actuates the driving means 20, 21, the spindle or sleeve 18 rotates and the shaft 22 which is coupled to it by means of the serrations of the serrated coupling 25 rotates with it. Since the crank assembly or crank drive 29 has no eccentricity, no revolving, that is orbital or planetary motion, is imparted to the work table or platen 10. It is to be noted that in this relation the right-hand eccentric drive 11 is identical and is driven by the same main drive motor and has the same effective eccentricity of zero. The drive is preferably effected by the same drive belt 20.

The setting of a desired degree of eccentricity will be described in the following. This is implemented by components depicted in the lower part of FIG. 2. For this purpose, a coupling 31 must engage a dog clutch plate or entrainment member 32. This is implemented by a cylinder 34 mounted in a support 35, which presses its piston or spindle 36 against a contact boss or stop of an adjustment drive wheel 37. Shaft 38, which is mounted in a bushing 39 in rotatable and axially movable fashion and connects the drive wheel 37 of the adjustment drive with the coupling 31, is urged upwards by the piston or spindle 36, so that the drive wheel 37 is connected to the dog clutch plate or entrainment member 32. Bushing 39 is mounted in the support 33. Supports 33, 35 and 49 are fixed components of the machine base or framework 15 of the apparatus.

The upper part or plate-like portion of the dog clutch plate or entrainment member 32 is provided with a recess having an internal gear ring 40. The lower part of the shaft 22 is provided with a not particularly referenced flange. The periphery of this flange is provided with the external gear ring 41 which meshes with an internal gear ring 40. Upward motion of the piston 36 urges the coupled entrainment member 32 upward into contact with an abutment or stop 43. This upward motion separates the serrated rings 26, 27 of the serrated coupling 25 from one another so that there is no longer a fixed connection between the spindle 18 and the shaft 22. The desired degree of eccentricity can now be set.

An electric motor not shown in the drawings, for instance a stepping motor, which is located in the base 15 of the apparatus, drives the adjustment drive wheel 37 via the belt 45 which is connected to both eccentric drives 11. Shaft 22 is turned in relation to the spindle 18 by the gear rings 40, 41, the dog clutch plate or entrainment member 32, the coupling 31, the shaft 38 and the adjustment drive wheel 37. The adjustment drive means 37, 45 is operated until the desired degree of eccentricity is set by turning the crank assembly or crank drive 29 in the work table or platen 10. This operation requires a time that lies between one and five seconds. Then the piston 36 returns to its initial or starting position. Adjustment drive means 37, 45 and the coupling 31 follow this motion. Spring 43 returns the shaft 22 to its initial position and causes it to reengage the spindle 18 through the serrated coupling 25.

Figure 3:
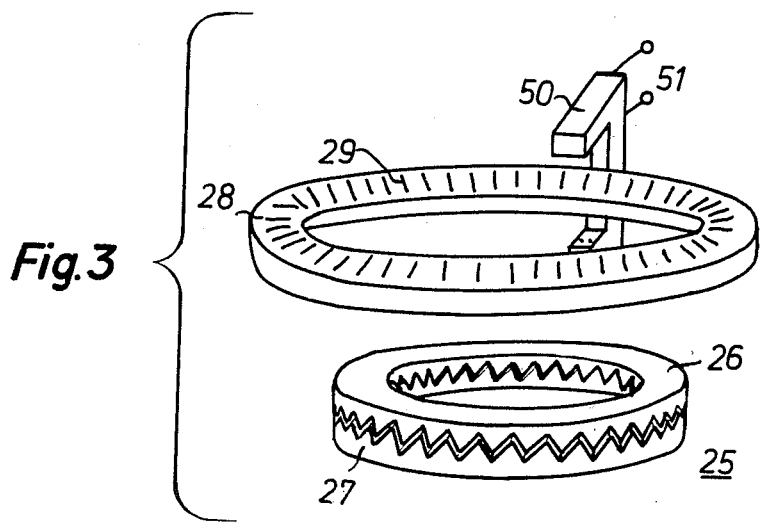
FIG. 3 schematically illustrates part of the mechanism of FIG. 2.

The procedure described for adjusting the degree of eccentricity of both eccentric drives 11 is controlled either by the operator from the operating console 7 or by an operating program in the NC-control unit 12. The degree of eccentricity set is recorded by a sensor or feeler 50 mounted on the upper serrated ring 26 of the serrated coupling 25 (FIG. 3). In place of the sensor 50, a stepping motor may be employed as drive motor for adjusting the eccentricity. This value is transmitted to a display device in the operating console 7 or to the NC-control unit 12. Main drive 20, 21 is restarted. Work table or platen 10 now executes a planetary or orbital motion having the degree of eccentricity just set. If the spatial configuration to be given to the workpiece 9 requires further adjustments of the eccentricity, they can readily be carried out in the manner just described.

Since the planetary motion of the work table or platen 10 often carries great masses (weights) with it, there is a need for mass compensation. As will be seen from FIG. 10, this can be implemented by providing a third eccentric drive 11 underneath the work table or platen 10 whose crank assembly imparts planetary motions to counterweights or counterweight means 110. The third eccentric drive 11 is identical to both eccentric drives 11 already described. The main drive 20, 21 which rotates the spindle 18 and the adjustment drive means 37, 45 which is used to set the degree of eccentricity are identical. The third eccentric drive 11 is also driven by the same motors. The third eccentric drive 11 differs only in that the main drive 20, 21 and the adjustment drive means 37, 45 turn in the opposite direction. This can be implemented by causing the drive wheels 21 and 37 to engage the drive belts or drive chains 20, 45 in reverse. It is important that the third eccentric drive move the counterweights or counterweight means 110 in the reverse direction to the planetary motion of the work table or platen 10.

In some cases, the weights or masses on the work table or platen 10 can be considerably greater than the counterweights or counterweight means 110. In such cases, the third eccentric drive 11 is given a greater degree of eccentricity for its smaller counterweights or counterweight means 110 than is given to both eccentric drives 11 of the work table or platen 10. For instance, the third eccentric drive 11 can be given a radius which is greater by a factor of 10. It will be understood that the third eccentric drive 11 is also controlled by the operating console 7 or by the NC-control unit 12.

FIG. 3 illustrates details of the serrated or serration coupling 25. The upper serrated ring 26 which is mounted on the lower side of the flange 24 and the lower serrated ring 27 which is mounted on the spindle 18 normally intermesh. They are only disengaged during the adjustment or setting of the eccentricity. In the present illustrative example each serrated ring is provided with 180 serrations. This means that each serration corresponds to an angular displacement of 2°. It also corresponds to an average change in eccentricity of 0.1 mm. It will be understood that these values can be increased or reduced by corresponding design measures.

Upper serrated ring 26 is provided with an index ring 28 having index marks or graduations 29. Index ring 28 can also be mounted on the periphery of the flange 24. When the eccentricity is adjusted this ring 28 turns with the flange 24. The sensor or feeler 50 detects the index marks 29 passing it and transmits the corresponding electric signals via leads 51 to the display device in the operating console 7 or to the NC-control unit 12. Index marks 29 can be optically detected. In this case, the index ring is of a transparent material such as glass and has opaque index marks 29. Sensor 50 is provided with two optical detection gates or light barriers which are disposed at a specific distance from one another. In this manner both the direction and the amount of eccentric adjustment can be detected. The corresponding electric signals are imposed on the leads 51 in either analog or digital form.

If magnetic detection or scanning is employed, the index ring 28 is formed of non-magnetic material. Sensor 50 is provided with two magnetic detection or scanning devices which transmit the direction and degree of eccentric adjustment as signals on the leads or conductors 51. With other kinds of sensors the detection can also be done mechanically or electrically. Such sensors are known and need not be described in detail here.

The illustrative example of FIG. 2 is not the only way of producing planetary or orbital motion. It could also be produced by an x/y coordinate table arrangement or cross-table. The one table would have to perform sine motions on one coordinate and the other table cosine motions on the other coordinate. The superposition of both motions produces a planetary or orbital motion.

Figure 4:
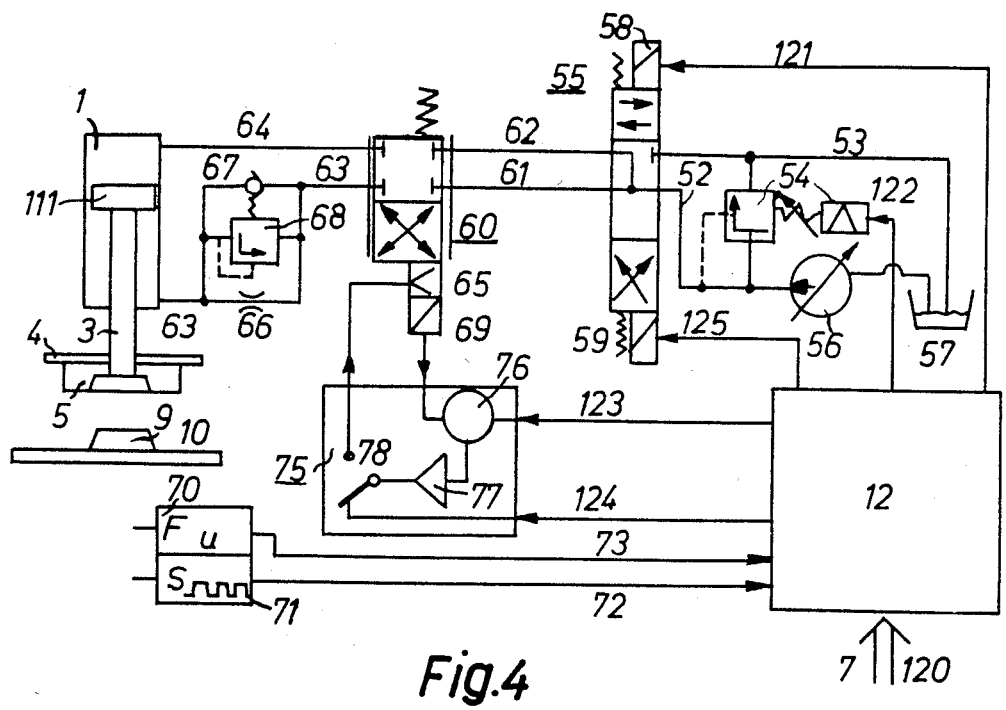
FIG. 4 schematically illustrates a hydraulic regulation and actuation system for controlling feed, retract and advance motions.

FIG. 4 shows the hydraulic system installation 13 which effects the feed motion of the abrading die member 5 as well as its periodical retract and advance motion. A 4/3-way valve 55 is connected with a pump 56 by a conduit 52 which supplies the pressure medium required for the hydraulic system, for instance oil, and can deliver a variable quantity according to the feed conditions. The relation between rate of feed and delivery rate of the pump is fixed by the selective position of the 4/3-way valve 55. The return conduit 53 of the 4/3-way valve 55 is connected with a reservoir 57 which supplies the pump 56 with oil. Valve 55 is provided with two electromagnets 58, 59 which are activated by the NC-control unit 12 through the leads or conductors 121, 125. Symbols are depicted at each end of the valve 55 to represent valve return springs. Downstream from the 4/3-way valve 55, there is a proportional valve 60 disposed in close proximity to the abrading apparatus, specifically the operating or hydraulic cylinder 1. Short connecting conduits or lines 63, 64 to the operating cylinder 1 are highly desirable.

For the purpose of describing the function of FIG. 4 assume that the die member 5 which is mounted on the platen or ram plate 4 of the ram 3 is to be moved in the direction of the workpiece 9 and the work table or platen 10. This corresponds to the feed motion and the rapid advance motion. For the downward feed, the magnet 58 on the valve 55 is selected; the rapid advance motion is controlled only by the signal or release line 123 and the enable line 124. The other motions will be described later.

For the feed motion, the NC-control unit 12 activates the electromagnet 58, so that the valve 55 connects the conduit 52 from the pump 56 to the conduit 61 of the proportional valve 60 and connects the return conduit 62 from the proportional valve 60 with a pressure conduit 61. The NC-control unit 12 controls an electromagnet 65 of the proportional valve 60 through leads 123, a comparator 76, an amplifier 77 and a switch 78 of a proportional control 75 such that the pressure conduits 61, 64 are connected to one another. The pressure medium, for instance oil, flows from the supply pump 56 through the pressure conduits 52, 61, 64 into the upper chamber of the operating cylinder 1 and urges the piston 111 of ram 3 downward. The oil in the lower chamber of the operating cylinder 1 flows out through the return conduits or lines 63, 62. The effective piston area in the lower chamber is substantially smaller than that of the upper chamber. By means of this arrangement, the supply pump 56 is not required to pump as large a quantity of oil. The return oil is fed back into the pressure conduit 61 in the valve 55. There is a check valve 67 in the return conduit 63 which blocks the flow of oil out of the lower chamber of the operating cylinder 1. In the state presently being described, the oil can only flow through a throttle or restricting valve 66 which maintains such a high back pressure that the ram 3 and piston 111 move the die member 5 toward the workpiece 9 at a very low rate of speed. If this rate of speed is to be increased, a valve 68, which opens when a predetermined pressure has been exceeded, acts as a bypass to the throttle or restricting valve 66.

FIG. 4 shows two boxes 70, 71 in the proximity of the die member 5 and the work table or platen 10 with the workpiece 9. These are symbolical representations of measuring devices. Measuring device 70 is a force-measuring device which measures the abrading force F between the die member 5 and the workpiece 9 and transmits a voltage signal U (analog or digital) through a lead 73 to the NC-control unit 12.

Measuring device 71 is a path or displacement-measuring device which measures the displacement Z of the die member 5 in the Z-coordinate direction. Displacement-measuring device 71 generates electrical impulses which are transmitted through a lead 72 to the NC-control unit 12. These impulses contain information about the direction of motion and the momentary position of the die member 5. The displacement Z can, for instance, be detected by the depth measuring device 2 of FIG. 1. Both measuring devices 70, 71 are provided with sensors at locations most advantageous for their operation.

The proportional control 75 illustrated in FIG. 4 comprises a comparator 76 which compares signals representing the predetermined rate of feed (NC-control unit 12, lead 123) with signals from a measuring member or element 69 which represent actual measured values. Measuring member 69 detects the true position of the control valve body in the proportional valve 60. When there is a difference between the two electrical signals, the comparator 66 generates an electrical differential signal which is transmitted through the amplifier 77, which has an adjustable degree of amplification, and the switch 78 to the electromagnet 65 and it moves the control valve body in the proportional valve 60 until the desired valve position programmed in the NC-control unit 12 is reached. Proportional control or regulator 75 renders the control valve body of the valve 60 insensitive to static and dynamic disturbing forces, so that the motion between the die member 5 and the workpiece 9 can be controlled very accurately in relation to the values programmed in the NC-control unit 12.

NC-control unit 12 also processes the actual value signals of the measuring devices 70, 71. The proportional valve is continually controlled during the feed motion, the periodical retract and advance motion and during the dynamically controlled transitions between the individual types of motion. The proportional valve is further regulated when the surfaces engaged in abrading action between the die member 5 and the workpiece 9 increase in area during the abrading procedure. The regulation processes will be described in more detail later in conjunction with FIGS. 6, 7 and 8.

Proportional control or regulator 75 is only in operation when a so-called enable or release signal is present on a lead 124. This safety measure ensures that the piston 111 in the operating cylinder 1 does not make any undesired motions. When no enable signal is present, the switch 78 is in the neutral position as illustrated in the drawing. The proportional control 75 is then inactive. The control valve body of the proportional valve 60 is returned by the valve return spring whose symbol is shown above the valve in FIG. 4, so that the piston 111 cannot execute any motion.

FIG. 4 shows a second proportional valve 54 between the pressure conduit 52 of the pump 56 and the return conduit 53 to the reservoir 57 which is controlled by the NC-control unit 12 through a lead or conductor 122. The maximum pressure for the entire hydraulic system or installation can be changed by means of this proportional valve. A reduction in pressure is effected by a reduction of the spring loading or bias 54, so that a portion of the oil flows out of the pressure conduit 52 into the return conduit 53. An increase in the delivery pressure of the pump 56 is effected by increasing the spring loading on the valve 54 by means of a magnet.

The NC-control unit 12 defines the degree of pressure change on a lead or conductor 122. The data bus 120 supplies the NC-control unit 12 with the program of the abrading work including the different types of motion between the die member 5 and the workpiece 9. When for instance the prescribed abrading displacement $Z_2$ (FIG. 5) is not attained within a prescribed time $t_2$, the pressure is increased in such manner that the abrading process is accelerated. The acceleration, however, is chosen with consideration to the fragility of the materials of the die member 5 and the workpiece 9. When the die member 5 has completed the prescribed abrading displacement $Z_2$ sooner than the prescribed time $t_2$, the pressure is reduced by the proportional valve 54.

When a retraction of the die member 5 from the workpiece 9 is provided in the program introduced into the NC-control unit 12 via the data bus 120, the 4/3-way valve 55 is activated by a lead 125. Electromagnet 59 moves the control valve body in the valve 55 to connect the pressure conduit 52 of the supply pump 56 with the conduit 62. Conduit 61 is connected to the return conduit 53 which leads to the reservoir 57. Proportional control or regulator 75 and the proportional valve 60 are also activated through a lead 123. The electromagnet 65 moves the control valve body in the valve 60 to permit the pump 56 to pump oil into the lower chamber of the operating cylinder 1 through the pressure conduits 52, 62 and 63 and through the check valve 67 which opens in this direction of flow. The oil from the upper chamber of the operating cylinder 1 flows through the conduits 64, 61 and 53 into the reservoir 57. Die member 5 moves away from the workpiece 9 at a low rate of speed.

Up to this point, those motions of the die member 5 toward and away from the workpiece 9 which take place at a low rate of speed have been described with reference to FIG. 4.

Periodical motion having much higher rates of speed must also be carried out within certain times, for instance between 1 second and 120 seconds. These periodical motions comprise a rapid retraction of the die member 5 from the workpiece 9 and a rapid advance of the die member 5 toward the workpiece 9. This rapid retract and advance motion cannot be permitted to occur suddenly, since it could then damage portions of the surface of the workpiece 9. This disadvantage of known systems can be explained by the fact that a rapid retraction of the die member 5 from the workpiece 9 induces a vacuum in the abrading gap 46 since the flushing fluid of the flushing system 14 cannot be supplied fast enough. Such a vacuum requires that the piston 111 and ram 3 in the operating cylinder 1 be urged upward with great force, which causes damage to the surfaces.

Furthermore, such sudden changes of the motion process generate dynamic forces, such as strong impulses and shocks in the entire system. This can diminish the accuracy of precisely adjusted components. The same is also true when the die member 5 is moved toward the workpiece 9 at high speed and comes to a sudden stop. In this case, there is a sudden increase of pressure since the flushing fluid in the diminishing abrading gap is very quickly compressed and the flushing system 14 is not able to take appropriate corrective measures, such as more rapid removal of the flushing fluid and reduction of the flushing fluid supply. This also produces heavy impulses and shocks in the system.

Figure 9:
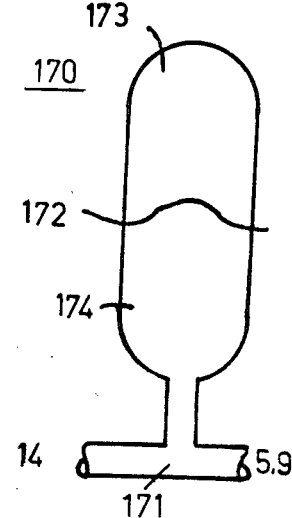
FIG. 9 schematically illustrates a detail of the apparatus.

Since the periodical motions for the removal of abraded material from the abrading gap 46 are unconditionally necessary, it is a primary object of the present invention to provide a new and improved construction of abrading apparatus which avoids the aforementioned disadvantage of undesirable impulses and shocks. The illustrative exemplary embodiment of FIG. 4 avoids such impulses and shocks. The disadvantageous sudden changes in pressure of the flushing fluid are eliminated by means of a compensation chamber 170, which, according to FIG. 9, is disposed in a fluid conduit 171 between the flushing system 14 and the die member 5 or the workpiece 9. The flushing fluid in the conduit 170 is under a pressure generated by a conventional supply pump of the flushing system 14. Compensation chamber 170 is divided in its intermediate region by an elastic membrane or diaphragm 172 into two chambers 173, 174. The upper chamber 173 is filled with air and sealed. The lower chamber 174 is filled with flushing fluid.

When there is a sudden increase in pressure in the abrading gap 46 caused by a rapid motion of the die member 5 towards the workpiece 9, flushing fluid escapes into the lower chamber 174 of the compensation chamber 170. This prevents a sudden increase in pressure in the abrading gap 46. When there is a reduction in pressure in the abrading gap 46 (the die member 5 moves away from the workpiece 9), a sufficient amount of flushing fluid flows out of the pressurized chamber 174 into the abrading gap 46 to sufficiently augment the flow of flushing fluid supplied by the pump of the flushing system 14. The air pressure in the upper chamber 173 supplies the necessary pressure. In this case, a damaging decrease in pressure in the abrading gap 46 is avoided. Furthermore, the flushing process requires less time and supplies greater quantities of flushing fluid, so that the pump and the conduits in the entire flushing circuit can be sized smaller. The compensation chamber 170 of FIG. 9 will also function without the membrane 172.

In the exemplary embodiment of FIG. 4 of the invention, the NC-control unit 12 initiates these rapid periodical motions through leads 121, 122, 123 and 125. Valves 54, 55 and 60 control these rapid motions. Proportional valve 60 is designed to cooperate with the NC-control unit 12 to perform the transitions between the periodical motions (high speed) and the feed and retract motions (low speed) gently. The hydraulic system is also able to reduce the very great differences of the changes in speed to reasonable values. This increases the working accuracy of the apparatus.

Figure 5:
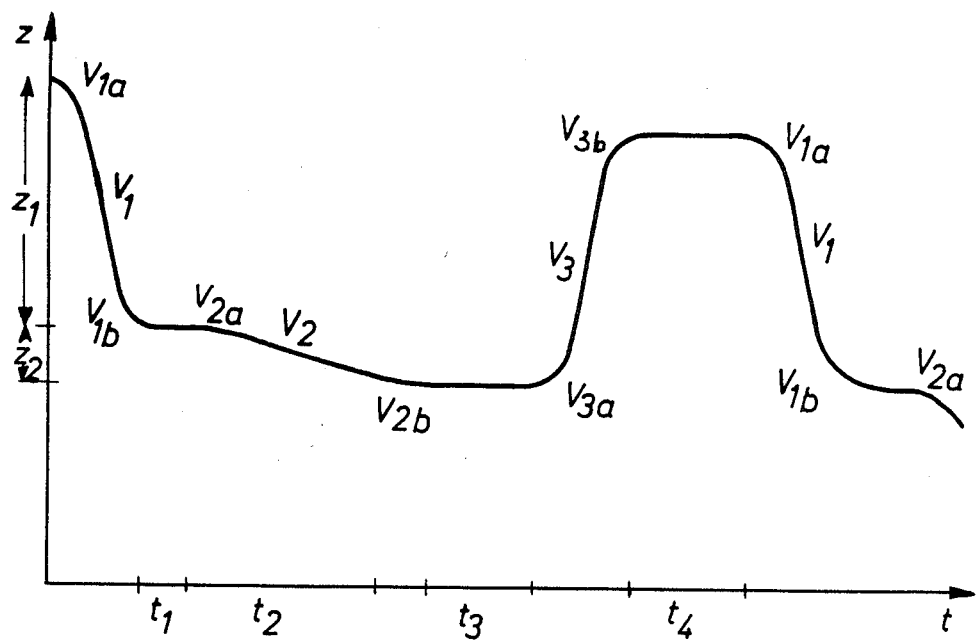
FIG. 5 is a diagram relating feed motions and periodical retract and advance motions to time.

The motion cycle of the die member 5 will now be described in more detail with reference to FIG. 5 and in relation to the hydraulic system of the invention shown in FIG. 4. The axes of the graph of FIG. 5 are calibrated with time t on the abscissa and the displacement Z on the ordinate. Assume that the die member 5 is moved at a high rate of speed $V_1$ in the direction of the workpiece 9. The displacement that the die member 5 undergoes is designated as $Z_1$. The first part $V_{1a}$ of the speed curve is the controlled transition (acceleration) from speed "0" to the rapid advance speed $V_1$. When the die member 5 comes into close proximity with the workpiece 9, the controlled transition (deceleration) from the rapid advance speed $V_1$ to the speed "0" takes place. This part of the speed curve is designated $V_{1b}$.

After a short duration $t_1$ of approximately 0.1 seconds (speed=0), the die member 5 travels at the low rate of feed $V_2$. In this period $T_2$ of approximately 1 to 30 seconds the workpiece 9 is abraded. Workpiece 9 executes planetary or orbital motion. Planetary drives 11 of FIGS. 1 and 2 impart motion to the work table or platen 10. Die member 5 progresses into the workpiece 9 with displacement or path $Z_2$. Controlled transitions $V_{2a}$ (acceleration) and $V_{2b}$ (deceleration) are also provided for the slow feed rate $V_2$.

After a short period $t_3$ of approximately 0.4 seconds, the die member 5 is retracted at the high rate of speed $V_2$ from the workpiece 9. The retraction displacement or path $Z_3$ is equal to the advance displacement or path $Z_1$ but is shifted downwards by an amount equal to the abrading displacement or path $Z_2$. The transitions $V_{3a}$ (acceleration) and $V_{3b}$ (deceleration) are also provided here. Die member 5 remains for a short period $t_4$ of approximately 0.5 seconds in the position farthest away from the workpiece 9 (speed=0). Then the next cycle begins.

The cycle shown in FIG. 5 has a duration of between 1 and 60 seconds. The system of FIG. 4 ensures that the speeds $V_1$, $V_2$ and $V_3$ and their transitions $V_{1a}$, $V_{1b}$, $V_{2a}$, $V_{2b}$, $V_{3a}$ and $V_{3b}$ are adapted to the momentary conditions in the abrading gap 46. This is particularly true for the case where the die member 5 progresses deeper into the workpiece 9 and the surfaces engaged in abrading increase in size. The speeds and their transitions are modified. The times $t_1$, $t_2$, $t_3$ and $t_4$ can, for instance, be changed to eliminate the pause intervals and to lengthen the abrading time $t_2$. The abrading time $t_2$ can also be shortened. The duration of a cycle can also be made longer than 60 seconds.

One cycle follows another until the abrading process terminates. As will be described in more detail later in conjunction with FIGS. 6, 7 and 8, when the predetermined abrading depth in the workpiece 9 has been reached (that is, at termination of the abrading process), one or more cycles $V_3$, $V_1$ may be repeated without the feed motion $V_2$. The number of these so-called abrading-out or post-abrading cycles can either be rigidly programmed or made dependent upon a minimum value of the abrading pressure in the abrading gap. This is implemented by the NC-control unit 12. The advantage of these cycles is that the accuracy of the abraded spatial dimensions of the workpiece 9 is increased in all respects.

Figure 6:
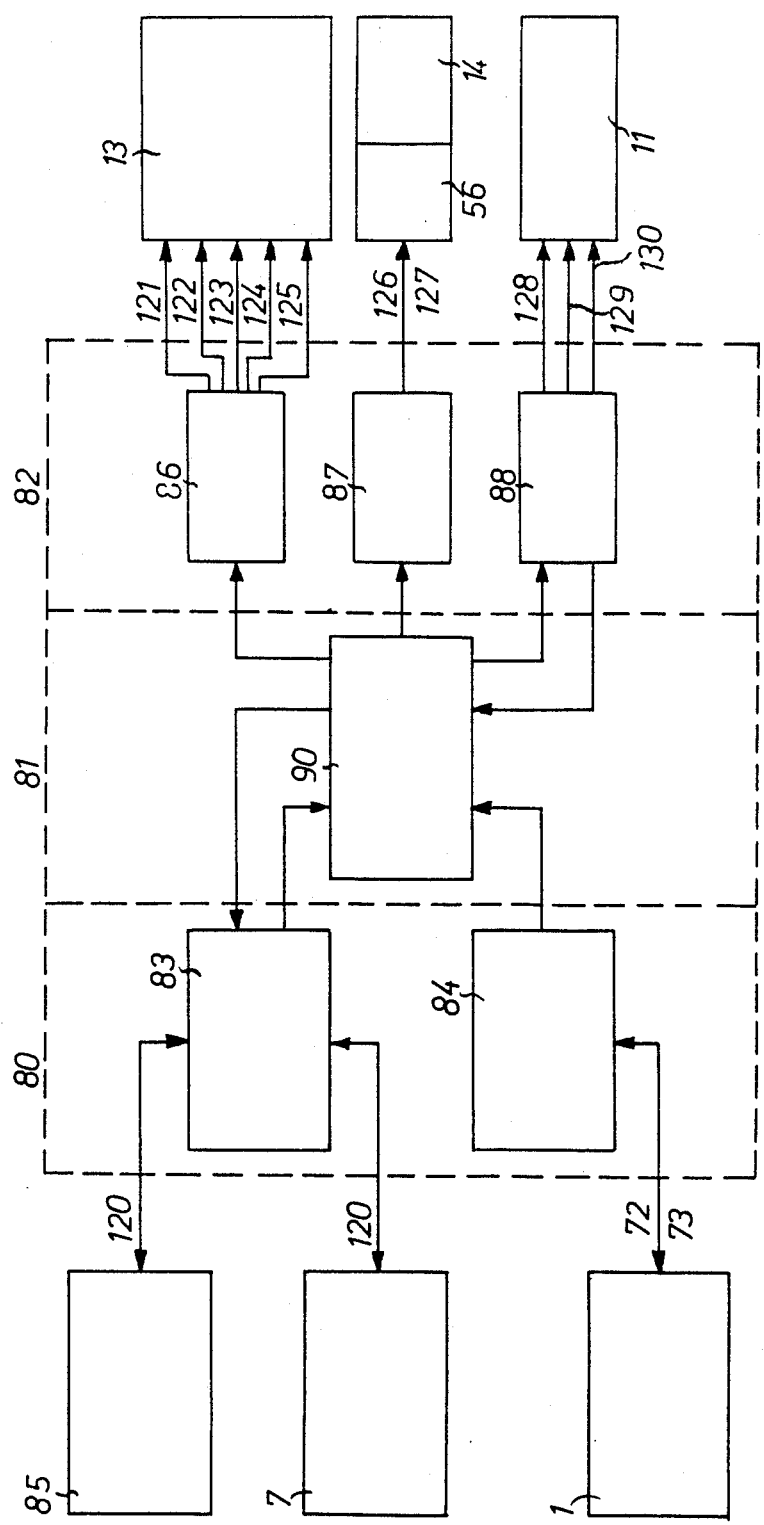
FIGS. 6, 7 and 8 schematically illustrate an electronic control system for the embodiments of the apparatus of FIGS. 1-4.

FIG. 6 shows in block diagram the individual components of the NC-control unit 12 divided into input units, central processing units, output units and peripheral units. These components are known per se so that their function need only be described as far as necessary for understanding the invention. Input unit 80 comprises an operation interface 83 and an apparatus or machine interface 84. The program input means comprising a program storage unit 85 and the operating console 7 are connected with the operation interface 83 by a data bus 20. The flow of data in the data bus 120 is bidirectional as indicated by the arrows. As has already been mentioned in conjunction with FIGS. 1 and 4, the complete program for the entire abrading process of the workpiece 9 is stored in the program storage unit 85 (for instance on magnetic storage media) and/or the program can optionally be modified or entered by an operator through the operating console 7. The operator stores the entered or modified data in one of the storage units of the program input unit 85.

Figure 7:
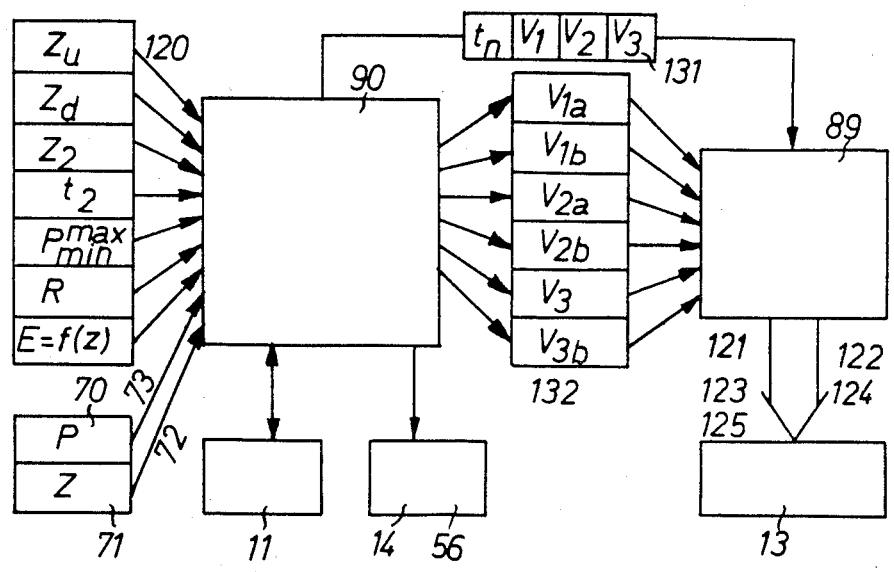

Operating cylinder 1 is connected to the apparatus interface 84 by leads 72, 73 (FIGS. 4, 6 and 7). The data pertaining to the program can be seen in FIGS. 7 and 8. Both interfaces 83, 84 transmit the data to the central processing unit 90 where they are processed with due consideration to the prescribed rules of technology and the results are transmitted to the output unit 82. The arrows of the connecting leads indicate the flow of data, and in the output unit 82 as many interfaces 86, 87, 88 are provided as there are peripheral control units 13, 11, 14, 56 necessary for controlling the entire abrading process of the workpiece 9. Hydraulic system 16 is connected to the interface 86 for controlling the valves 54, 55, 60 and the proportional control 75 (FIG. 4) by leads 121, 122, 123, 124, 125. The hydraulic and flushing interface 87 is connected to the supply pump 56 of the hydraulic system 13 and to the supply pump of the flushing and filtering unit 14 by leads 126, 127. The drive motor which drives the eccentric drives 11 into planetary or orbital motion (FIGS. 1 and 2) by the drive means 20, 21 is controlled by the apparatus interface 88 through leads 128. The adjusting motor which adjusts the eccentricity of the eccentric drives 11 (FIGS. 1, 2 and 10) by the adjustment drive means 37, 35 is controlled by the apparatus or machine interface 88 through lead 129. The same apparatus interface 88 of FIG. 6 controls via lead 130 the electromagnet of the cylinder 34 which engages the coupling 31 in the entrainment member 32 shortly before adjustment of the eccentricity and disengages again after completion of the adjustment (FIG. 2).

FIG. 7 shows the input data necessary for execution of the entire abrading process on the workpiece 9 which are either stored in the program storage unit 85 or are entered by an operator via the operating console 7. The limits of the full motion of the die member 5 in the Z-coordinate direction are defined. The values $Z_u$ for the upper limit and $Z_d$ for the lower limit (depth stop dimension 2) are entered. The value $Z_2$ gives the displacement in millimeters that the die member 5 is to undergo in the Z-coordinate direction during one abrading cycle. The value $T_2$ indicates the duration in seconds which is not to be exceeded in the abrading process at the prescribed speed $V_2$ (see also FIG. 5). The value $P_{min}$ is the lower limit value or threshold in Kp/mm$^2$ below which the abrading pressure between the die member 5 and the workpiece 9 is not to fall. This value $P_{min}$ is also intended to be a lower limit for the planetary abrading-out or idle motions of the workpiece 9 which take place at the end of the entire abrading process without any feed in the Z coordinate direction until the value $P_{min}$ has been reached in order to increase the accuracy of the spatial configuration of the workpiece 9. The value $P_{max}$ is the upper limiting value or threshold above which the abrading pressure between die member and the workpiece 9 is not to rise, since otherwise portions of the workpiece surface could be damaged.

The number of cycles or of periodical retract and advance motions (FIG. 5; retract $V_3$, advance $V_1$) for the entire abrading process is entered as the value R. The eccentricity as a function of the penetration depth of the die member 5 into the workpiece 9 (Z-coordinate direction) is entered as value or function $E=f(Z)$. Since it is known for every depth of penetration Z how great a surface area of the die member 5 and of the workpiece 9 are mutually engaged in abrading, the amount of eccentricity E with which the planetary motion of the workpiece 9 in the x and y coordinate directions is to be carried out can be determined. For each value of the penetration depth Z there is a specific value of the eccentricity E. This dependence between Z and E can be represented in a graph as whatever curve is desired. This dependence is preferably represented as a straight line or a circular arc.

The technological values mentioned above are transmitted by the data bus 120 to the central processing unit 90 where they are processed. Measuring device 70, which has its sensor on or in the abrading gap 46 or in the supply conduit 171 of the flushing fluid from flushing system 14 to the flushing channels in the workpiece 9, continuously transmits the electric signals which indicate the actual value of pressure P between the die member 5 and the workpiece 9 through a lead 73 to the central processing unit 90. Measuring device 71, whose sensor is for instance mounted on the depth stop or measuring device 2 (FIG. 1), transmits its information concerning the actual position of the die member 5 in the Z-coordinate direction as electrical impulses through the lead 72 to the central processing unit 90.

All input data are processed in this central processing unit 90 of FIG. 6 according to prescribed rules. This will be described with reference to FIGS. 1, 2, 5, 6 and 7 in the following. The drive motor, the adjustment drive motor and the displacement cylinder 34 of the eccentric drives 11 are controlled through the leads 128, 129 and 130. Supply pump 56 is controlled by the lead 126 and generates pressure in the hydraulic system 13 (FIG. 4) in such a manner that the abrading force is constantly adapted to the conditions in the abrading gap 46 between the die member 5 and the workpiece 9. This adaptation is continuous during the abrading process (feed motion of die member 5 in $Z_2$-coordinate direction and planetary motion of workpiece 9 in x-y coordinate directions). The supply pump in the flushing and filtering system 14 can also be controlled by the lead 127, so that the pressure in the flushing medium can be adapted within certain limits to the conditions in the abrading gap 46 between the die member 5 and the workpiece 9. This relates to the abrading process in the $Z_2$-coordinate direction and especially relates to the periodical retract and advance motion ($V_3$, $V_1$).

The central processing unit 90 transmits through the data bus 131 the speeds $V_1$, $V_2$, $V_3$ which have been adapted to conditions in the abrading gap 46 as well as the dynamically controlled transitions $V_{1a} \ldots V_{3b}$ to an advance selector 89. From there individual information is transmitted in a prescribed sequence through leads 121, 122, 123, 124, 125 to the valves 54, 55, 60 and to the proportional control or regulator 75 of the hydraulic system 13.

Figure 8:
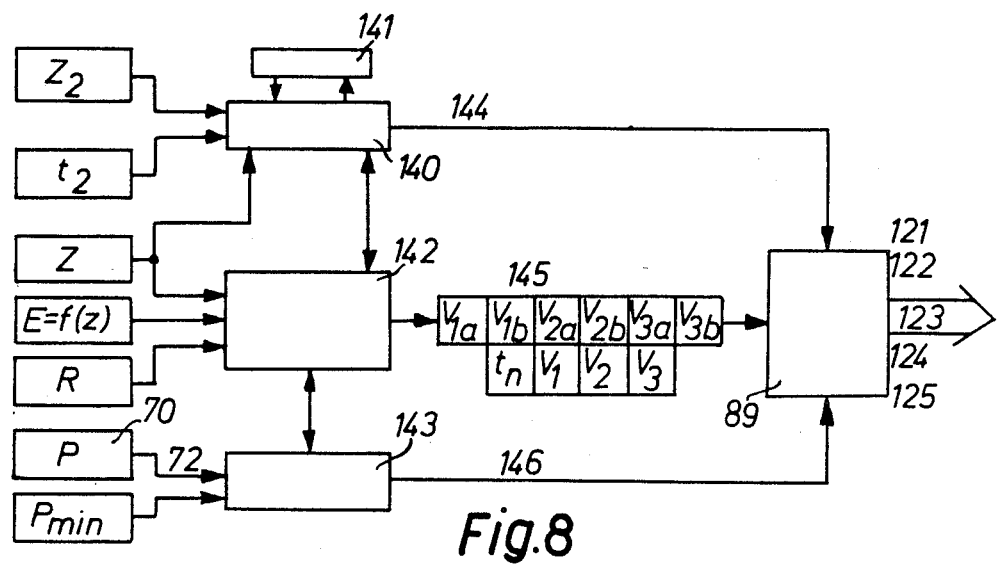

FIG. 8 illustrates the control of the hydraulic system 13 for each cycle. Both comparators 140, 143 and the processor 142 are components of the central processing unit 90 of FIGS. 6 and 7. The program input from the program storage unit 85 or from the operating console 7 is carried out with approximately the same values as those illustrated in FIG. 7. $Z_2$ and $t_2$ are the abrading displacement and the abrading time allowed to the die member 5 in each cycle. These values are entered into the comparator 140 which cooperates with a clock device 141 as a reference or standard value. The abrading displacement Z for all cycles serves as a basis of comparison and is entered into the comparator 140 and into the processor 142. The processor 142 communicates with the comparator 140 and monitors the abrading process, assuring that the abrading process is terminated in each cycle when the abrading displacement $Z_2$ has been reached before the abrading time $t_2$ or the reverse has occurred. In this case, a termination signal is generated and transmitted through a lead 144 to the advance selector 89.

The values of $Z_2$ and $t_2$ can be different for each cycle. This depends on the type of spatial configuration to be generated and on the material of the workpiece 9. The workpiece 9 may for instance be composed of several different materials. The number R of prescribed cycles is entered into the processor 142 for this purpose. The value of the eccentricity E as function of the entire abrading displacement Z is also entered into the processor. This has already been described with reference to FIG. 7.

The eccentric drives 11 are disabled or blocked in the same manner as in the illustrative example of FIG. 7. In each cycle the eccentricity E of the planetary or orbital motion of the workpiece 9 can be different. The value $P_{min}$ is the lower limit of pressure in the abrading gap 46 below which the abrading pressure must not fall. Measuring device 70 transmits the actual value of the pressure between the die member 5 and the workpiece 9 to the comparator 143 through the lead 72. Comparator 143 compares this actual value with the prescribed value $P_{min}$. Processor 142 is in constant communication with the comparator 143 and assures, by modifying the control signals on the data bus 145, that the lower pressure limit $P_{min}$ is never reached. Should this nevertheless occur, a signal designated "no feed" is transmitted through a lead 146 to the advance selector 89. The program of the current cycle is then repeated. In most cases, the conditions in the abrading gap 46 will have improved, so that the abrading process on the workpiece 9 may be continued.

If the so-called abrading-out planetary motions at the end of the entire abrading process are included in the program, the central processing unit 90 of FIGS. 6 and 7 assures that these motions are carried out without feed until the lower limit of pressure $P_{min}$ is reached and then the apparatus is shut down.

The processor 142 of FIG. 8 transmits the control values for the speeds $V_1$, $V_2$, $V_3$, for the transitions $V_{1a}$ ... $V_{3b}$ and for the times $t_n$ ($t_1$, $t_2$, $t_3$ . . . ) through the data bus 145 to the advance selector 89 which activates the valves 54, 55, 60 and the controller or regulator 75 in the hydraulic system 13 through the leads 121, 122, 123, 124, 125 in a prescribed sequence. Exactly as in FIG. 7, the abrading pressure between the die member 5 and the workpiece 9 and the speed of the various motions are adapted to the conditions in the abrading gap 46.

Preferred illustrative embodiments of the invention have been described with reference to FIGS. 1 through 9. Individual parts of these embodiments may be modified without departing from the basic inventive principles and concepts. For instance, the hydraulic system 13 of FIGS. 1 and 4 which implements the feed motion at a low rate of speed during abrading, the periodical retract and advance motions at a high rate of speed as well as the transitions between these types of motion can be replaced by an electrical circuit.

Furthermore, FIG. 1 shows only a single die member 5 and a single corresponding workpiece 9. It will be understood that a plurality of die members and corresponding workpieces, i.e. a plurality of such pairs of coacting members may also be provided and abraded in the same operation. Each pair (die member 5 and workpiece 9) must be mounted on its platen (4, 10) in spaced relation to other pairs. This measure eliminates inaccuracies in abrading due to the elasticity of the machine components 1, 3, 4, 8, 10 subjected to dynamic operating forces. This problem arises not only when one side of the workpiece 9 is to be more heavily abraded than the other side, but also when all sides are to be abraded equally.

While there are shown and described present preferred embodiments of the invention, it is to be distinctly understood that the invention is not limited thereto, but may be otherwise variously embodied and practiced within the scope of the following claims.

Accordingly, what we claim is:

1. An apparatus for shaping an electrode workpiece to a prescribed spatial configuration, especially an abrading machine for shaping an electrode workpiece by means of an abrading die member having substantially the spatial configuration of the electrode workpiece but different dimensions to leave an abrading gap therebetween, wherein an abrading medium and a relative motion of a first kind between said abrading die member and the electrode workpiece generate or refine the desired spatial configuration of the electrode workpiece, said relative motion of a first kind comprising a composite motion composed of a feed motion and a planetary motion, and wherein there is provided a periodically retract and advance motion of a second kind between the abrading die member and the electrode workpiece to improve flushing conditions in said abrading gap, comprising:

means for the automatic selective adjustment of a degree of eccentricity of said planetary motion;
selectively releasable engagement means for automatically latching a selected degree of said eccentricity; and
means for automatically controlling and accomodating to the conditions prevailing in the abrading gap (i) an abrading pressure between the abrading die member and the electrode workpiece during said feed motion, (ii) the speed of the feed motion, and (iii) the speed of the periodical retract and advance motion of the second kind.

2. The apparatus as defined in claim 1, further including:

a work table provided for the electrode workpiece;
said means for automatically selectively adjusting the degree of eccentricity of said planetary motion comprises:
a housing;
a spindle having an axis of rotation and rotatably mounted in said housing;
drive means cooperating with one end of said spindle for imparting rotary motion thereto;
a shaft rotatably disposed within said spindle and having an axis of rotation;
said selectively releasable engagement means operatively connecting the other end of the spindle located opposite to the one end cooperating with said drive means with one end of said shaft; and
crank means provided for said one end of the shaft for operatively engaging the work table.

3. The apparatus as defined in claim 2, wherein:
the axis of rotation of the spindle is offset with respect to the axis of rotation of the shaft.

4. The apparatus as defined in claim 1, wherein:
said means for automatically selectively adjusting the degree of eccentricity of the planetary motion comprises:
a housing;
a spindle having an axis of rotation and rotatably mounted in said housing;
drive means cooperating with one end of said spindle for imparting rotary motion thereto;
a shaft rotatably disposed within said spindle and having an axis of rotation;
said shaft being provided with a flange at one end;
crank means having a central axis and mounted on the flange end of said shaft;
coupling means mounted on an end of said shaft located opposite said flange; and the central axis of said crank means being displaced from said axis of rotation of the shaft.

5. The apparatus as defined in claim 4, wherein:
the axis of rotation of the spindle is offset with respect to the axis of rotation of the shaft.

6. The apparatus as defined in claim 4, wherein:
said coupling means contains gearing means; and
said means for the automatic selective adjustment of the degree of eccentricity automatically transmits rotational movement to the shaft for setting a desired degree of eccentrically by means of said coupling means and said gearing means and imparts an axial motion to the shaft for automatically disengaging said engagement means from the spindle.

7. The apparatus as defined in claim 1, further including:
a work table provided for the die member;
at least one further means for the automatic adjustment of the eccentricity of the planetary motion;
at least one counterweight cooperating with one of said automatic adjustment means;
a crank drive;
at least one said automatic adjustmnet means engaging the work table by means of the crank drive to induce a planetary motion in one direction;
a further crank drive;
the other automatic adjustment means engaging said at least one counterweight by means of the further crank drive to induce planetary motion in an opposite direction; and
the respective degrees of eccentricity selected being unequal in relation to the ratio of the weights of the workpiece and the work table to the weight of said counter rotating counterweight.

8. The apparatus as defined in claim 1, wherein: said selectively releasable engagement means comprise:
an upper gear ring and a lower gear ring;
said upper gear ring being operatively connected with said shaft;
said lower gear ring being operatively connected with said spindle; and
said upper and lower gear rings being selectively engageable and disengageable with one another.

9. The apparatus as defined in claim 1, further including:
a ring member provided with index marks cooperating with said selectively releasable engagement means; and
detection means cooperating with said ring member for sensing said index marks in order to determine a selected degree of eccentricity.

10. The apparatus as defined in claim 1, further including:
operating cylinder means provided for said abrading die member;
said controlling means comprising:
a control valve;
a proportional valve disposed in the proximity of said operating cylinder means;
regulator means provided for said proportional valve; and
an NC-control unit which activates said control valve, said proportional valve and said regulating means.

11. The apparatus as defined in claim 10, wherein:
said NC-control unit controls transitions between the feed motion and the motions of the second type while taking account of their adaptation to conditions in the abrading gap.

12. The apparatus as defined in claim 10, wherein:
said proportional valve and said NC-control unit control the transitions of greatly differing speeds of the feed motion and of the motion of the second type while taking into account feed displacement of the abrading die member.

13. The apparatus as defined in claim 10, wherein:
said proportional valve and said NC-control unit adapt high rates of speed and low rates of speed to conditions in the abrading gap.

14. The apparatus as defined in claim 10, wherein:
said proportional valve and said NC-control unit control the feed motion in relation to a feed displacement of the abrading die member and control the motion of the second type in relation to a prescribed time.

15. The apparatus as defined in claim 10, wherein:
said proportional valve and said NC-control unit control the feed motion in relation to a prescribed abrading time and control the motion of the second type in relation to a displacement defining the stroke of said motion of the second type.

16. The apparatus as defined in claim 10, further including:
a supply pump for the proportional valve;
a further proportional valve disposed between said proportional valve and said supply pump; and
said NC-control unit and said further proportional valve increasing pressure when a relative abrading displacement of the abrading die member prescribed by said NC-control unit is not attained within a desired time.

17. The apparatus as defined in claim 10, further including:
a supply pump for the proportional valve;
a further proportional valve disposed between said proportional valve and said supply pump; and
said NC-control unit and said further proportional valve increasing pressure by a prescribed amount when a desired relative feed displacement of the abrading die member is not attained within a prescribed abrading time.

18. The apparatus as defined in claim 10, wherein:
said NC-control unit adjusts the eccentricity in relation to a relative feed displacement of the abrading die member by means of a program.

19. The apparatus as defined in claim 18, wherein:
said NC-control unit controls the eccentricity in relation to the feed displacement according to a desired curve.

20. The apparatus as defined in claim 10, wherein:
said NC-control unit causes a final cycle of motion of the second type to be repeated at least once upon reaching a prescribed abrading depth without repeating the feed motion.

21. The apparatus as defined in claim 17, wherein:
said NC-control unit causes a last cycle of motion of the second type to be repeated until a force between said abrading die member and the electrode workpiece reaches a prescribed minimum value.

22. The apparatus as defined in claim 10, further including:
a stepping motor capable of responding to control signals transmitted by said NC-control unit; and
said stepping motor stepwise actuating said means for the selective adjustment of the degree of eccentricity.

23. The apparatus as defined in claim 1, further including:
a flushing system for flushing the abrading gap;
a compensation chamber disposed between the flushing system and the abrading die member or the electrode workpiece for automatically maintaining substantially constant flushing conditions in the abrading gap.

24. The apparatus as defined in claim 1, further including:
a work table for supporting the workpiece;
a platen for supporting the abrading die member cooperating with said workpiece;
at least one further die member mounted on the platen;
at least one further workpiece mounted on said work table for cooperation with said at least one further die member; and
each said pair of coacting workpiece and abrading die member being disposed in offset spaced relation to each such other pair.

25. An apparatus for shaping a workpiece to a prescribed spatial configuration by an abrading process, comprising:
at least one abrading die member having a spatial configuration which is substantially the negative of the prescribed spatial configuration of the workpiece;
linear drive means for automatically and selectively imparting to said at least one abrading die member a relatively slow feed motion toward the workpiece, a relatively rapid retract motion away from the workpiece and a relatively rapid advance motion toward the workpiece in a direction of linear motion;
said feed motion advancing said at least one abrading die member in abrading engagement with the workpiece during the abrading process;
orbital drive means for imparting to the workpiece an orbital abrading motion in a plane of orbital motion extending substantially perpendicular to said direction of linear motion;
said orbital abrading motion having an orbital magnitude which substantially defines the abrading magnitude of an abrading gap formed between said at least one abrading die member and the workpiece during the abrading process;
said orbital drive means including eccentric means for automatically altering said orbital magnitude of said orbital abrading motion;
conduit means for introducing an abrading medium into said abrading gap for at least partially generating conjointly with said at least one abrading die member in response to said orbital abrading motion and said feed motion the prescribed spatial configuration of the workpiece;
said retract motion periodically retracting said at least one abrading die member from abrading engagement with the workpiece for improving flushing conditions of said abrading medium in said abrading gap;
said advance motion subsequently returning said at least one abrading die member into abrading engagement with the workpiece for further improving flushing conditions of said abrading medium in said abrading gap and for resuming the abrading process;
control means operatively connected with said orbital drive means, said eccentric means and said linear drive means for automatically controlling the abrading process;
said control means comprising starting means for automatically actuating said orbital drive means at the commencement of the abrading process and speed regulating means for automatically regulating the speed of said orbital drive means during the abrading process;
said control means comprising adjustment means for inducing said eccentric means to automatically alter said orbital magnitude of said orbital abrading motion;
said control means comprising feed regulating means for inducing said linear drive means to automatically impart said feed motion to the workpiece;
said feed regulating means comprising force regulating means for regulating said linear drive means such that said abrading force between said at least one abrading die member and the workpiece confirms to a prescribed variation in value;
said control means comprising flushing cycle regulating means for inducing said linear drive means to automatically perform said retract motion and said subsequent advance motion; and
said control means comprising finishing cycle regulating means for inducing said linear drive means to automatically suppress said feed motion at prescribed time intervals.

26. The apparatus as defined in claim 25, wherein:
said control means comprise a numerical control processor;
said numerical control processor comprising program storage means for storing a prescribed abrading program for the abrading process; and
said numerical control processor comprising data storage means for storing predeterminate reference data for said prescribed abrading program.

27. The apparatus as defined in claim 26, wherein:
said speed regulating means of said control means automatically regulates the speed of said orbital drive means according to said prescribed abrading program.

28. The apparatus as defined in claim 26, wherein:
said adjustment means of said control means controls said eccentric means according to said prescribed abrading program.

29. The apparatus as defined in claim 26, wherein:
said control means comprises a hydraulic system for controlling said linear drive means;
said linear drive means comprising hydraulic cylinder and piston means; and
said feed regulating means of said control means regulating said linear drive means through said hydraulic system according to said prescribed abrading program.

30. The apparatus as defined in claim 26, wherein:
said flushing cycle regulating means controls said linear drive means according to said prescribed abrading program.

31. The apparatus as defined in claim 26, wherein:
said finishing cycle regulating means controls said linear drive means according to said prescribed abrading program.

32. The apparatus as defined in claim 25, further including:
sensing means for providing said control means with feedback signals relative to the abrading process; and
connector means connecting said sensing means to said control means for conducting said feedback signals.

33. The apparatus as defined in claim 32, wherein:
said sensing means comprise rotary indexing sensor means associated with said eccentric means for detecting a degree of alteration of said orbital magnitude of said orbital abrading motion effected by said eccentric means;

said rotary indexing sensor means transmitting a signal corresponding to a momentary angular position of said eccentric means relative to said orbital drive means via said connector means to said control means;

said control means comprising comparator means for comparing said momentary angular position to a prescribed angular position; and said control means controlling said eccentric means for adapting said momentary angular position to said prescribed angular position.

34. The apparatus as defined in claim 32, wherein:

said sensing means comprise a depth stop sensor for sensing a predeterminate maximum allowable extent of said feed motion corresponding to a desired degree of completion of the abrading process and of attainment of the prescribed spatial configuration of the workpiece;

said depth stop sensor transmitting a feed limit signal to said control means via said connector means; and said control means halting said linear drive means in response to said feed limit signal.

35. The apparatus as defined in claim 32, wherein:

said sensing means comprise a pressure sensor arranged in said conduit means for sensing a momentary pressure in said abrading medium;

said pressure sensor transmitting a momentary pressure value signal to said control means via said connector means;

said control means comprising comparator means for comparing said momentary pressure value signal with a prescribed pressure value; and said force regulating means of said feed regulating means regulating said linear drive means for adapting said momentary pressure value to said prescribed pressure value.

36. The apparatus as defined in claim 32, further including:

a platen for mounting the workpiece;

said sensing means comprising a force-measuring device arranged in proximity to said at least one abrading die member and said platen for measuring an abrading force between said at least one abrading die member and the workpiece;

said force-measuring device transmitting a signal corresponding to a momentary abrading force to said control means via said connector means;

said control means comprising comparator means for comparing said momentary abrading force to a prescribed abrading force value; and said force regulating means of said feed regulating means regulating said linear drive means for adapting said momentary abrading force to said prescribed abrading force value.

37. The apparatus as defined in claim 32, further including:

a platen for mounting the workpiece;

said sensing means comprising a displacement-measuring device arranged in proximity to said at least one abrading die member and said platen for measuring an abrading displacement in said direction of linear motion of said at least one abrading die member in relation to the workpiece;

said displacement-measuring device transmitting a signal corresponding to a momentary amount of abrading displacement to said control means via said connector means;

said control means comprising comparator means for comparing said momentary amount of abrading displacement to a said force regulating means of said feed regulating prescribed abrading displacement; and means regulating said linear drive means for adapting said momentary amount of abrading displacement to said prescribed abrading displacement.

38. The apparatus as defined in claim 25, wherein:

said feed motion has a predeterminate speed of feed;

said retract motion having a predeterminate retract speed;

said advance motion having a predeterminate advance speed;

said advance speed being greater than said speed of feed;

said retract speed being greater than said speed of feed and of opposite sense;

said speed of feed, said retract speed and said advance speed being separated by predeterminate transition accelerations; and said control means controlling said linear drive means to effect said predeterminate speed of feed, said predeterminate retract speed, said predeterminate advance speed and said predeterminate transition accelerations.

39. The apparatus as defined in claim 25, wherein:

said eccentric means of said orbital drive means comprises:

a housing;

a hollow spindle rotatably mounted in said housing and having a first axis of rotation;

main drive means cooperating with said hollow spindle for imparting rotary motion thereto;

a shaft rotatably mounted within said hollow spindle and having a second axis of rotation eccentric to said first axis of rotation;

secondary drive means for selectively engaging and imparting rotary motion to said shaft independently of said hollow spindle;

selectively releasable latching means for latching said shaft against rotation in relation to said hollow spindle; and crank means provided on said shaft for transmitting said orbital abrading motion to the workpiece.

40. The apparatus as defined in claim 39, further including:

at least one counterweight means;

at least one further orbital drive means;

said orbital abrading motion having a first sense of orbital revolution;

said further orbital drive means operatively engaging said at least one counterweight means for imparting thereto an orbital compensation motion having a second sense of orbital revolution opposite to said first sense; and said further orbital drive means including eccentric means for automatically altering an orbital magnitude of said orbital compensation motion.

41. The apparatus as defined in claim 40, wherein:

said counterweight means has a predetermined compensatory mass;

said platen and the workpiece having a predeterminate joint mass; and said orbital magnitude of said orbital compensation motion being greater than said orbital magnitude of said orbital abrading motion in the same ratio that said predeterminate joint mass is greater than said predetermined compensatory mass.

* * * * *

UNITED STATES PATENT AND TRADEMARK OFFICE
CERTIFICATE OF CORRECTION

PATENT NO. : 4,557,075

DATED : December 10, 1985

INVENTOR(S) : Werner Ullmann et al

It is certified that error appears in the above—identified patent and that said Letters Patent is hereby corrected as shown below:

Page 1 in the title, please delete "PRESCRIBE" and insert --PRESCRIBED--

Column 1, line 2 in the title, please delete "PRESCRIBE" and insert --PRESCRIBED--

Column 8, line 67, at the end of the line after "drive" please insert --11--

Column 14, line 3, please delete "V3b" and insert --$V_{3b}$--

Column 24, line 3, after "a" insert-prescribed abrading displacement; and--

Column 24, line 4, at the end of the line please delete "pre-"

Column 24, line 5, please delete "scribed abrading displacement; and"

Signed and Sealed this

Twenty-fifth Day of February 1986

[SEAL]

Attest:

DONALD J. QUIGG

Attesting Officer

Commissioner of Patents and Trademarks